W. F. CONROY.
LOCK NUT.
APPLICATION FILED AUG. 5, 1913.
1,143,508.
Patented June 15, 1915.
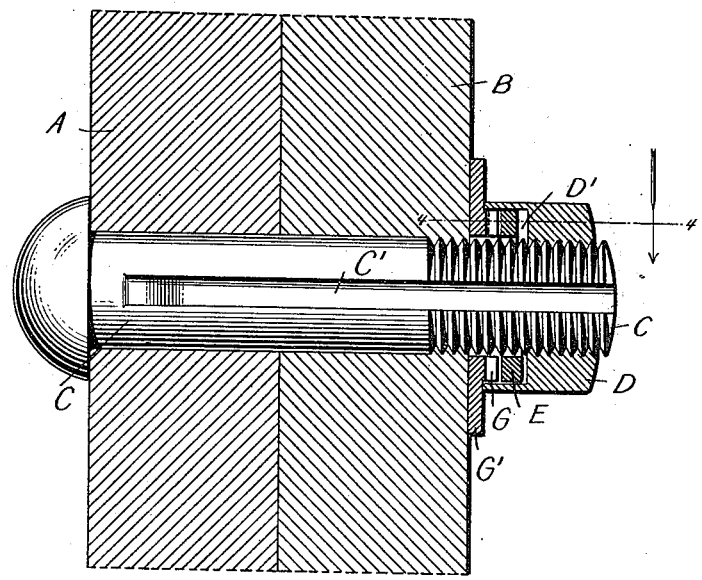
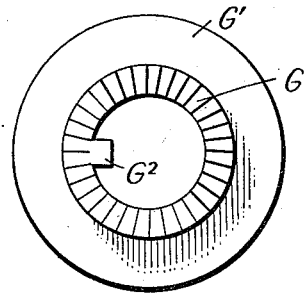
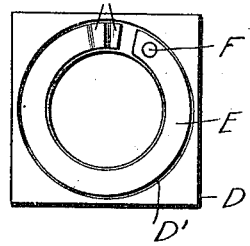
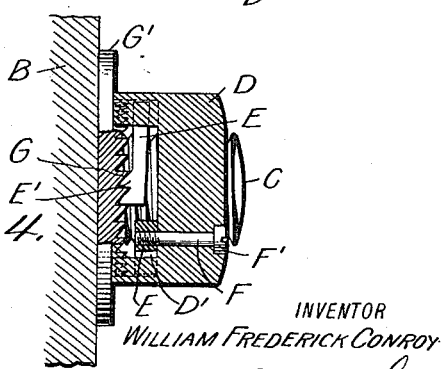
WITNESSES
INVENTOR
WILLIAM FREDERICK CONROY
BY
ATTORNEYS

UNITED STATES PATENT OFFICE.

WILLIAM FREDERICK CONROY, OF NANUET, NEW YORK.

LOCK-NUT.

1,143,508.

Specification of Letters Patent. Patented June 15, 1915.

Application filed August 5, 1913. Serial No. 783,045.

*To all whom it may concern:*

Be it known that I, WILLIAM FREDERICK CONROY, a citizen of the United States, and a resident of Nanuet, in the county of Rockland and State of New York, have invented a new and Improved Lock-Nut, of which the following is a full, clear, and exact description.

The object of the invention is to provide a new and improved lock nut arranged to permit of screwing up a nut on a bolt to the desired position, to securely lock the nut against accidental unscrewing and to allow an operator to unscrew the nut whenever it is desired to do so.

In order to accomplish the desired result use is made of a nut provided on the under side with a recess in which is arranged a flat spring secured to the nut at one end and provided at its free end with a tooth engaging ratchet teeth on a retaining member held against turning. Use is also made of a screw fastening the spring in place in the nut and extending lengthwise in the nut to be accessible from the outer face of the nut to allow of unfastening the spring whenever it is desired to remove the nut.

A practical embodiment of the invention is represented in the accompanying drawings forming a part of this specification, in which similar characters of reference indicate corresponding parts in all the views.

Figure 1 is a sectional side elevation of a bolt and nut provided with the improvement and shown in position for fastening two parts together; Fig. 2 is a face view of the retaining member provided with the ratchet teeth; Fig. 3 is a rear face view of the nut; and Fig. 4 is a cross section of the same on the line 4—4 of Fig. 1.

As shown in Fig. 1 the parts A and B are fastened together by a bolt C and a nut D screwing on the said bolt C. The nut D is provided in its under side or base with a recess D' in which is arranged a flat helical spring E fastened to the bottom of the recess D' by the use of a screw F extending lengthwise in the nut D and screwing into the spring E, as plainly indicated in Fig. 4. The head F' of the screw F is countersunk in the outer face of the nut D so as to form no undesirable projection on the said nut. The free end of the spring E is provided with one or more teeth E' engaging ratchet teeth G arranged in a circle on a retaining member G', preferably in the form of a washer, loosely engaging the bolt C and having a key G² fitting into a key-way or groove C' extending lengthwise on the bolt C. By the arrangement described the retaining member G' is held against turning on the bolt C.

In fastening the parts A and A together the bolt C is engaged with the parts and then the retaining member G' is slipped over the free end of the bolt to rest against the outer face of the part B with the ratchet teeth G extending forwardly. The nut D is now screwed onto the outer end of the bolt C and when the nut D nears innermost position its tooth or teeth E' engage the ratchet teeth G and glide over the same on screwing up the nut D to final position, that is, until the parts A and B are securely fastened together. It will be noticed that the spring E and its tooth or teeth E' now act as a dog to prevent accidental unscrewing of the nut D on the bolt C. It will also be noticed by reference to Fig. 1 that when the nut D is screwed up to final position the ratchet teeth G extend within the recess D' of the nut D so that a very smooth joint is had between the parts of the nut D and the outer face of the retaining member G'. It will further be noticed that when the nut is screwed up the open end of the recess D' is completely closed and consequently no extraneous matter can lodge within the recess.

When it is desired to unscrew the nut D the operator unscrews the screw F' so as to unfasten the spring E from the nut D to allow of unscrewing the latter on the bolt C. After the nut D has been unscrewed the spring E is again fastened in place in the nut D by replacing the screw F so that the nut is again in condition for use on a bolt.

The lock nut shown and described is very simple in construction and can be cheaply manufactured and readily applied to bolts now generally constructed, it being understood that it is not absolutely necessary to provide the bolt C with the groove C' as the retaining member G' may be fastened in place on the part B to hold the retaining member against turning.

Having thus described my invention, I claim as new and desire to secure by Letters Patent:

1. A lock nut, comprising a retaining member held against turning and provided with ratchet teeth arranged in a circle, a nut provided at its under side with a recess, a spring arranged in the said recess and provided with a tooth engaging the ratchet teeth of the retaining member, and means for detachably securing the spring to the nut, said means being operable from the outer face of the nut.

2. A lock nut, comprising a retaining member held against turning and provided with ratchet teeth arranged in a circle, a nut provided at its under side with a recess, a spring arranged in the said recess and secured at one end to the nut, the free end of the said spring being provided with a tooth engaging the ratchet teeth of the retaining member, and a screw extending through the nut to the outer face thereof and screwing in the said spring to detachably fasten the latter in position in the recess of the nut.

3. In combination with a bolt, having a lengthwise extending groove, a retaining member slidable on the said bolt and provided with a key fitting into the said groove to hold the said retaining member against turning on the bolt, the said retaining member being provided with ratchet teeth arranged in a circle, a nut screwing on the said bolt and having its under side provided with a recess, a flat segmental spring arranged within the said recess and provided at its free end with a tooth in engagement with the said ratchet teeth, and a screw extending through the nut to the outer face thereof and screwing into the other end of the said spring to removably fasten the latter to the nut, the head of the screw being countersunk in the outer face of the nut.

In testimony whereof I have signed my name to this specification in the presence of two subscribing witnesses.

WILLIAM FREDERICK CONROY.

Witnesses:
C. E. HOLSKE,
PHILIP D. ROLLHAUS.

Copies of this patent may be obtained for five cents each, by addressing the "Commissioner of Patents, Washington, D. C."